United States Patent [19]

Shimazaki

[11] Patent Number: 4,824,210
[45] Date of Patent: Apr. 25, 1989

[54] LIQUID CRYSTAL PROJECTOR

[75] Inventor: Tatsuo Shimazaki, Higashimurayama, Japan

[73] Assignee: Casio Computer Co., Ltd., Tokyo, Japan

[21] Appl. No.: 93,108

[22] Filed: Aug. 28, 1987

Related U.S. Application Data

[63] Continuation of Ser. No. 812,293, Dec. 23, 1985, abandoned.

[30] Foreign Application Priority Data

Feb. 21, 1985 [JP] Japan .............................. 60-23790[U]
Feb. 21, 1985 [JP] Japan .............................. 60-23791[U]

[51] Int. Cl.$^4$ ....................... G02F 1/13; G03B 21/00; G03B 21/14; G03B 21/22
[52] U.S. Cl. ............................... 350/331 R; 350/334; 350/571; 353/122; 353/119
[58] Field of Search .................... 350/347 R, 336, 334, 350/331 R, 337, 571; 353/102, 122, 119

[56] References Cited

U.S. PATENT DOCUMENTS

| 4,090,775 | 5/1978 | Lobb | 350/571 |
| 4,436,393 | 5/1984 | Vandewerf | 353/102 |
| 4,770,524 | 9/1988 | Umeda et al. | 353/102 |

FOREIGN PATENT DOCUMENTS

| 0192023 | 8/1986 | European Pat. Off. | |
| 0146229 | 8/1985 | Japan | 350/336 |

OTHER PUBLICATIONS

Buchoff, "Conductive Elastomers Make Small Flexible Contacts", Electronics, Sep. 19, 1974, pp. 122-125.

Primary Examiner—Stanley D. Miller
Assistant Examiner—Anita E. Pellman
Attorney, Agent, or Firm—Frishauf, Holtz, Goodman & Woodward

[57] ABSTRACT

A liquid crystal projector is disclosed, which comprises a light source, a TV type liquid crystal display panel and a projecting lens system. The liquid crystal display panel faces the screen and is inclined with respect to a line perpendicular to an optical axis connecting the center of the liquid crystal display panel and the center of a screen by the suitable visual field angle of the liquid crystal display panel.

3 Claims, 4 Drawing Sheets

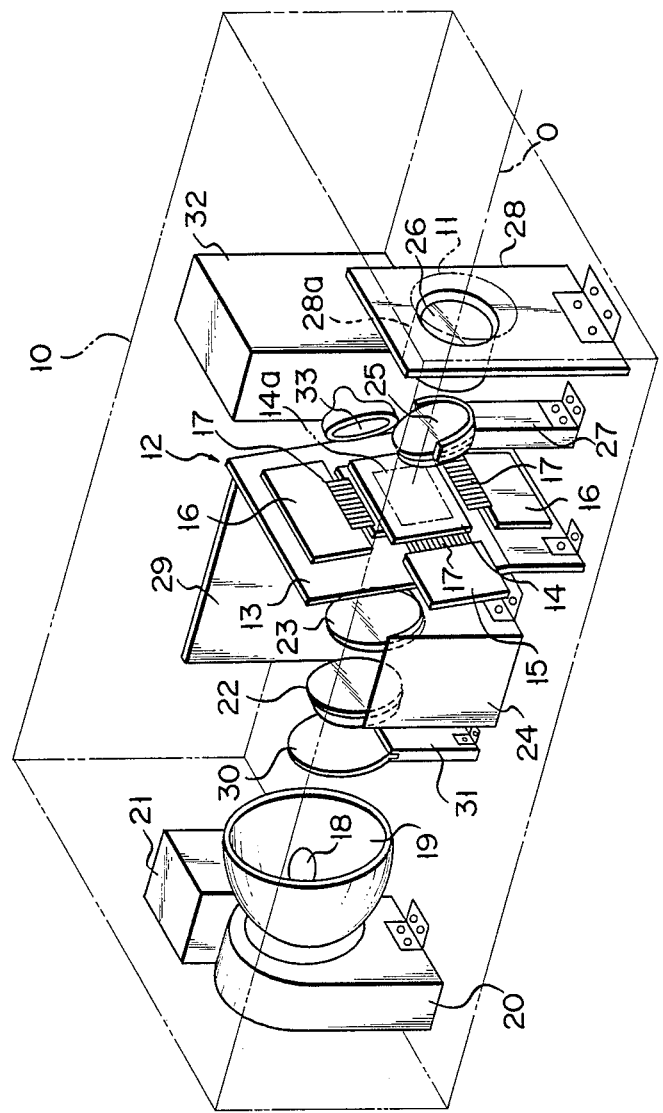
F I G. 2

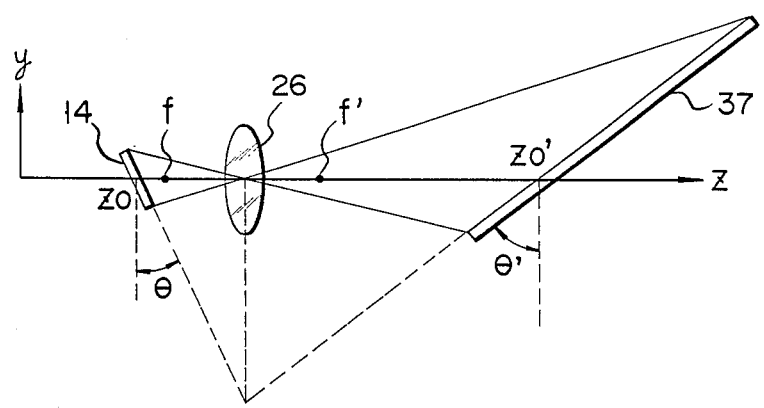
F I G. 4
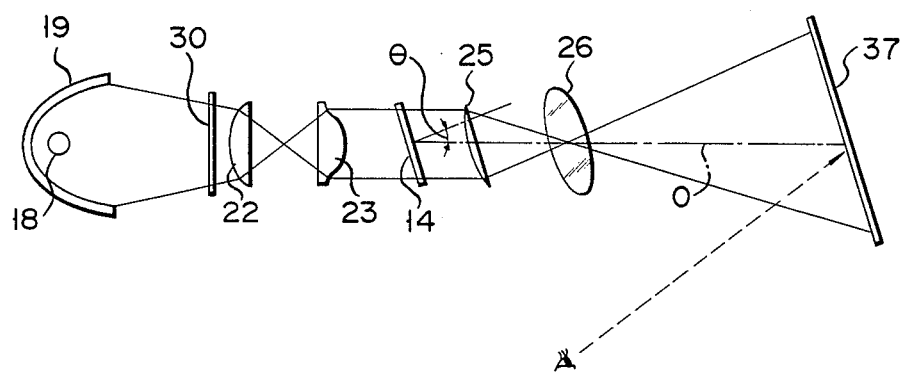
F I G. 5

LIQUID CRYSTAL PROJECTOR

This application is a continuation-in-part of application Ser. No. 812,293, filed Dec. 23, 1985 now abandoned.

BACKGROUND OF THE INVENTION

This invention relates to improvements of a liquid crystal projector.

A liquid crystal projector usually uses, for instance, a TN (twist nematic) transmission type liquid crystal display panel for displaying a television image thereon, while projecting the displayed image on an enlarged scale onto a screen.

In this liquid crystal projector, the liquid crystal display panel is usually illuminated on the back side by illumination light from a light source lamp to make the displayed image brighter. The displayed image is enlarged through a projecting lens system to project as an enlarged-scle image on the screen located forward of the display panel.

The TN type liquid crystal display panel usually has a visual field angle of 10° to 20°. Nevertheless, the liquid crystal display panel is usually disposed so that it is perpendicular to an optical axis connecting its center and the center of the screen. With this arrangement, the direction in which the displayed image on the liquid crystal display panel can be seen best, i.e., the direction deviating by the visual field angle noted above, is not perpendicular to the optical axis. Therefore, the image that is seen when the display surface of the liquid crystal display panel is seen in a direction deviating by the suitable visual field angle, is projected on the screen. The brightness and contrast of the projected image on the screen, therefore, are inferior to the case where the screen is positioned so that it deviates by the suitable visual angle of the display surface of the liquid crystal display panel.

In another aspect, in the prior art liquid crystal projector, the liquid crystal display panel is illuminated on the back side directly by light from a light source lamp. Therefore, the liquid crystal display panel is heated by the infrared component of the illumination light. In addition, the temperature of the interior of the case of the liquid crystal projector rises due to heat generated by the light source lamp. Therefore, the liquid crystal display panel is heated and this eventually results in a collapse of the molecular arrangement of the liquid crystal. In other words, the normal display of the liquid crystal display panel deteriorates when the projector is used over an excessively long period of time.

SUMMARY OF THE INVENTION

The invention is predicated in the above circumstances, and it has an object of providing a liquid crystal projector, which can project an image displayed on a TV liquid crystal display panel onto a screen very brightly and with good contrast.

To realize the above object of the invention, there is provided a liquid crystal projector, which comprises a light source means, a TN type liquid crystal display panel illuminated on the back side by light from the light source and projecting an image on an enlarged scale onto a screen, the liquid crystal display panel facing the screen and being inclined by the suitable angle of the visual field of the liquid crystal display panel with respect to a line perpendicular to an optical axis connecting the center of the liquid crystal display panel and the center of the screen, and projecting lens system means provided on the optical axis between the liquid crystal display panel and screen, for enlarging the image displayed on the liquid crystal display panel.

With this construction of the liquid crystal display panel where the liquid crystal display panel faces the screen and is inclined by the suitable angle of the visual field of the liquid crystal display panel with respect to a line perpendicular to the optical axis connecting the center of the liquid crystal display panel and the center of the screen, the displayed image on the liquid crystal display panel can be projected onto the screen very brightly and with good contrast.

Further, the infrared component of the light from the light source lamp is absorbed by an infrared absorption filter which is provided between the light source and the liquid crystal display panel. Therefore, the liquid crystal display panel can withstand a very long use.

Further, a display panel cooler is provided in the neighborhood of the liquid crystal display panel to supply cooling air thereto, thus preventing heating of the liquid crystal display panel due to heating of the projector case interior.

BRIEF DESCRIPTION OF THE DRAWINGS

FIG. 2 is a perspective view showing the structure of the embodiment of the liquid crystal projector in a case thereof;

FIG. 4 explains the tilting angle of the liquid crystal display panel relative to the screen in the liquid crystal projector of the present invention; and FIG. 5 shows the principle of another embodiment of the present invention.

DETAILED DESCRIPTION OF THE PREFERRED EMBODIMENT

Figure 1:
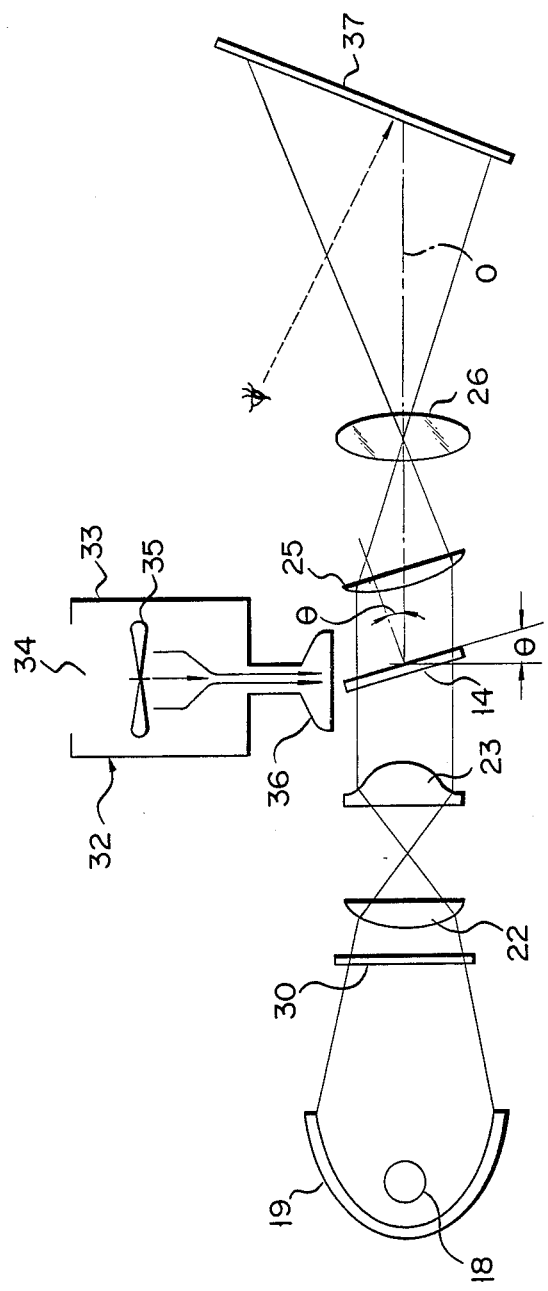
FIG. 1 is a schematic view showing an embodiment of the liquid crystal projector according to the invention.

An embodiment of the liquid crystal projector for projecting a television image on a screen will now be described with reference to FIGS. 1 and 2. Case 10 (FIG. 2) has projection window 11 at the front. Liquid crystal display unit 12 is disposed in case 10. Liquid crystal display unit 12 has support 13 projecting upright from the bottom of case 10. TN type transmission type dot matrix liquid crystal display panel 14 is provided on support 13 so that it faces projection window 11 at the front of the case. Display panel drive circuit substrate 15 extends from one side of liquid crystal display panel 14. Display panel drive circuit substrates 16 extend from the top and bottom of liquid crystal display panel 14. Circuit substrate 15 is a scanning side drive circuit substrate to drive scanning side electrodes of dot matrix liquid crystal display panel 14. Circuit substrates 16 are signal side drive circuit substrates to drive signal side electrodes of dot matrix liquid crystal display panel 14. Circuit substrates 15 and 16 are connected to terminal array sections of liquid crystal display panel 14 via film-like heat seal connectors 17. A portion of support 13 where the display panel is mounted is provided with a window or opening (not shown) slightly greater than display screen 14a of liquid crystal display panel 14. Thus, display screen 14a is not blocked by support 13.

Light source lamp 18 is provided in a rear portion of case 10. Reference numeral 19 designates a reflector with a cold mirror formed on the inner surface. Light source lamp 18 and reflector 19 are mounted on lamp support 20 which accommodates a fan (not shown) for cooling the lamp. Light source lamp 18 is a halogen lamp or a xenon lamp to provide as much light intensity as possible. Reference numeral 21 designates the lamp power source unit.

Condenser lens 22 is provided between light source lamp 18 and liquid crystal display panel 14. Relay lens 23, which is a non-spherical lens, is provided between capacitor lens 22 and liquid crystal display panel 14. Condenser lens 22 and relay lens 23 are mounted on lens support 24 secured to the bottom of the case. Condenser lens 25 is provided forward of liquid crystal display panel 14. Projecting lens system 26 is provided forward of condenser lens 25. Condenser lens 25 is mounted on lens support 27 secured to the case bottom. Projecting lens system 26 is provided in cylinder 28a provided on lens support 28 projecting upright from the case bottom.

Linear circuit substrate 29 is provided in case 10. Linear circuit substrate 29 is connected to display panel drive circuit substrates 15 and 16 of liquid crystal display unit 12 via cables (not shown). Linear circuit substrate 29 is connected to a receiving unit (not shown) including a television signal receiving circuit, an audio amplifier, a loudspeaker, etc. The receiving unit is provided either in case 10 or separately from the projector.

Infrared absorption filter 30 is provided between light source lamp 18 and liquid crystal display panel 14, for example, between light source lamp 18 and condenser lens 22. Infrared absorption filter 30 is mounted on filter support 31 extending upright from the case bottom. Infrared absorption filter 30 may be located in any desired position between light source lamp 18 and liquid crystal display panel 14.

Display panel cooler 32 is provided in case 10 on one side of liquid crystal display unit 12. Display panel cooler 32 has body 33, which accommodates fan 35 and has air inlet 34 open to the outside of case 10 (FIG. 1). Flat cooling air outlet 36 projects sidewise from body 33 and faces liquid crystal display unit 12. Cooling air is drawn into display panel cooler 32 and forced out by fan 35 sidewise from cooling air outlet 36 to blow against liquid crystal display panel 14 of liquid crystal display unit 12.

Liquid crystal display panel 14 of liquid crystal display unit 12, as shown in FIG. 1, is inclined with respect to a line perpendicular to optical axis O connecting the center of liquid crystal display panel 14 and the center of screen 37 by the viewing angle peculiar to liquid crystal display panel 14 (i.e., 10° to 20°). Condenser lens 25 is also inclined so that it is parallel to liquid crystal display panel 14.

Screen 37 is inclined by a predetermined angle in the opposite direction.

Figure 3:
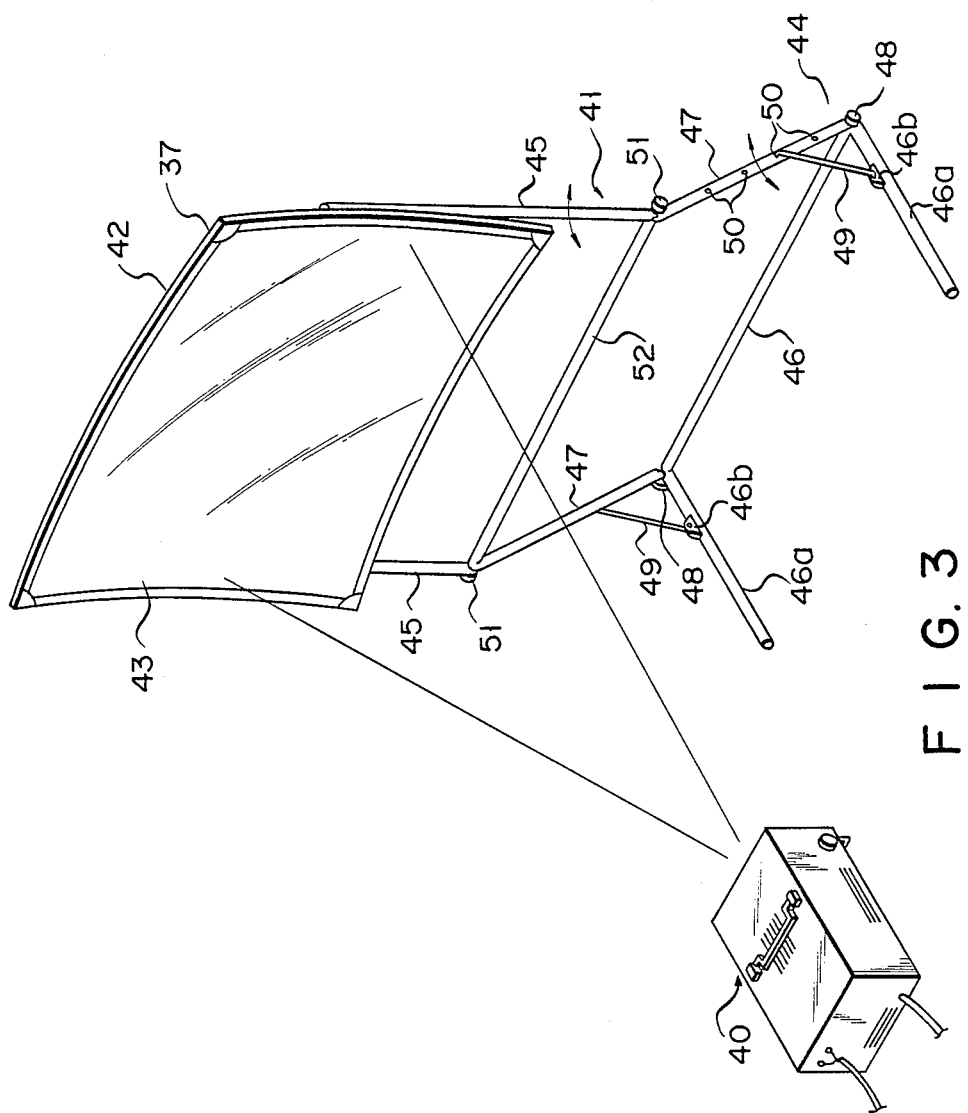
FIG. 3 is a perspective view showing the outer appearance of a stand used in the liquid crystal projector of the present invention.

FIG. 3 shows the construction of stand 41 for supporting screen 37. It is seen that liquid crystal projector body 40 whose internal structure is shown in FIG. 2 is disposed in front of screen 37. Screen 37 comprises screen body 42 sized at, for example, 50 inches×50 inches and hard screen sheet 43 covering screen body 42. The screen sheet is formed of a very thin aluminum sheet having a thickness of about 0.25 mm. A picture image is projected from liquid crystal projector body 40 onto screen sheet 43. As seen from the drawing, screen body 42 is supported by stand 41.

Stand 41 comprises leg body 44 put on the floor and a pair of supporting pipes or rods 45 whose lower ends are swingably pivoted to leg body 44. The leg body comprises horizontal base body 46 formed by bending a metal pipe or rod in " " and a pair of leg pipes or rods 47 rising from the rear corners of base body 46. The lower ends of leg pipes 47 are swingably pivoted by pivotal shafts 48 to the rear corners of base body 46. The swing of the leg pipes is fixed at a desired angle by pipe supporting rods 49 formed by bending at right angles the end portions of steel rods. The base bent end portions of the pipe supporting rods 49 are rotatably engaged with brackets 46b provided at pipe portions 46a on both sides of base body 46. On the other hand, the bent upper ends of pipe supporting rods 49 are selectively inserted into holes 50 formed in leg pipes 47 at a suitable interval in the longitudinal direction. It follows that the rising angle of leg pipes 47 can be controlled as desired by properly selecting holes 50 into which the bent upper ends of pipe supporting rods 49 are inserted.

The lower ends of supporting rods 45 are swingably pivoted by screws 51 to the upper ends of leg pipes 47, making it possible to swing screen body 42 about the lower ends of supporting rods 45. Naturally, screen body 42 is fixed at a desired angular position by fastening screws 51. In other words, inclination of screen 37 can be changed as desired by properly controlling screws 51. As seen from the drawing, the upper ends of leg pipes 47 are joined to each other by reinforcing pipe 52. The term pipe and rod is used interchangeably herein, and the corresponding elements could also be termed shafts, elongated members, etc.

FIG. 4 explains the inclination of liquid crystal display panel 14 and screen 37. For the sake of brevity, condenser lens 25 is omitted from FIG. 4. The letter f in FIG. 4 denotes the focus of projecting lens 26 on the side of liquid crystal display panel 14, with f' denoting the focus of projecting lens 26 on the side of screen 37. The inclination angle $\theta$ of liquid crystal display panel 14, which is generally called a viewing angle permitting the highest contrast, depends on, for example, the liquid crystal material, driving voltage and direction of orientation. Where liquid crystal display panel 14 is inclined, it is also necessary to properly incline screen 37. It should be noted that the axis or plane of screen 37 intersects with the axis or plane of liquid crystal display panel 14 on the axis of projecting lens 26, as shown by dashed lines in FIG. 4. The coordinates of the y-z plane on the liquid crystal display panel 14 can be represented by $Z_o + y \tan \theta$, where $Z_o$ is the position on the optical axis, i.e., y=0, with the focus f providing the origin. Likewise, the coordinates of the y-z plane on screen 37 can be represented by $Z_o' + y' \tan \theta'$, where $Z_o'$ is the position on the optical axis, with the focus f' providing the origin. It should be noted that the relationship given below is established in the drawing of FIG. 4:

$$(Z_o + y \tan \theta)(Z_o' + y' \tan \theta') = f \cdot f' = -f^2.$$

In the liquid crystal projector described above, a television image is displayed on liquid crystal display panel 14 of liquid crystal display unit 12, and the image displayed on liquid crystal display panel 14 is projected with its scale enlarged by projecting lens 26 on screen 37. Light emitted from light source lamp 18 and reflected from reflector 19 is incident on infrared absorption filter 30, and its infrared component is absorbed thereby. Resultant light from infrared absorption filter 30 is passed through condenser lens 22 and relay lens 23 to illuminate liquid crystal display panel 14 from the rear side thereof. Light having been passed through liquid crystal display panel 14, i.e., a light image corresponding to the displayed image on liquid crystal display panel 14 is converged by condenser lens 25 and enlarged by projecting lens system 26 to be projected on screen 37.

As has been shown, with the above liquid crystal projector liquid crystal display panel 14 is inclined with respect to a line perpendicular to optical axis O connecting the center of liquid crystal display panel 14 and the center of screen 37 by the angle of the proper visual field (i.e., at the proper viewing angle). Therefore, the image projected onto screen 37 may be seen as a display image on liquid crystal display panel 14 seen in the direction of the suitable visual field (i.e., at the proper viewing angle) thereof and thus has the maximum brightness and contrast. That is, with the above liquid crystal projector it is possible to project an image having the maximum brightness and contrast onto screen 37.

Further, in the above embodiment, infrared absorption filter 30 is provided between light source lamp 18 and liquid crystal display panel 14 so that the infrared component of the light emitted from light source lamp 18 and directed toward liquid crystal display panel 14 is absorbed by infrared absorption filter 30, preventing liquid crystal display panel 14 from being heated by the infrared component of the light. Further, liquid crystal display panel 14 is cooled by cooling air that is forced toward it from display panel cooler 32 provided on one side of it. When display panel cooler 32 is operated at all times during use of the projector, therefore, it is possible to prevent the heating of liquid crystal display panel 14 with the rise in temperature in the projector interior due to heat radiation from light source lamp 18. Therefore, with the liquid crystal projector there is no possibility that failure of normal operation of liquid crystal display panel 14 results from the heating of liquid crystal display panel 14 by the infrared component of light from light source lamp 18 or with a temperature rise of the projector interior. The projector thus can be used continuously for long periods of time.

Further, the invention is applicable to either a monochromatic liquid crystal projector using a monochromatic liquid crystal display panel or to a color liquid crystal projector using a color liquid crystal display panel. Further, while the above embodiment is concerned with the liquid crystal projector projecting a liquid crystal display device image onto projector 37, the invention is applicable as well to a monitor projector of a video tape recorder or a projector type game machine where an enlarged liquid crystal display panel image is projected onto a screen.

FIG. 5 shows another embodiment of the present invention. In this embodiment, condenser lens 25, projecting lens system 26 and screen 37 are inclined in parallel with inclined liquid crystal display panel 14. The particular arrangement permits preventing the picture image on the screen from being distorted.

What is claimed is:

1. A liquid crystal projector comprising:
a case provided with a projecting window;
a light source disposed within said case, said light source including a lamp and a reflecting mirror having an optical axis;
means for converting light emitted from said light source into a parallel light;
a liquid crystal display panel for displaying an image, said liquid crystal display panel being tilted at a predetermined angle with respect to said optical axis of said reflecting mirror and having a back surface irradiated with said parallel light;
condenser lens means for condensing light passing through said liquid crystal display panel;
projecting lens means for projecting in a magnified fashion the image displayed on said liquid crystal display panel by the light condensed by said condenser lens means through said projecting window of said case;
screen means arranged to receive the magnified image projected from said projecting lens means thereon for displaying said magnified image, said screen means being tilted at a predetermined angle in a direction opposite to the tilting direction of said liquid crystal display panel; and
means for cooling said liquid crystal display panel;
an angle $\theta$ formed between said liquid crystal display panel and a line perpendicular to said optical axis of said reflecting mirror bearing the following relationship with an angle $\theta'$ formed between said liquid crystal display panel and a vertical line of said screen means:

$$(Z_o + y \tan \theta)(Z_o' + y' \tan \theta') = f \cdot f' = -f^2$$

where:
f: focal length of said projecting lens means on the side of said liquid crystal display panel;
Zo: position on said optical axis of said reflecting mirror with "f" set as the origin;
y: position on a line perpendicular to said optical axis;
f': focal length of said projecting lens means on the side of said screen means;
Zo': position on said optical axis of said reflecting mirror with "f" set as the origin; and
y': position on a line perpendicular to said optical axis.

2. The liquid crystal projector of claim 1,
wherein said case has a bottom, and said liquid crystal display panel is supported by a supporting plate secured to the bottom of said case so as to face said projecting window of said cse; and
further comprising a driving circuit mounted to said supporting plate and coupled to said liquid crystal display panel for driving said liquid crystal display panel.

3. A liquid crystal projector comprising:
a light source including a lamp and a reflecting mirror having an optical axis;
a liquid crystal display panel for displaying an image, said liquid crystal display panel being tilted at a predetermined angle with respect to said optical axis of said reflecting mirror and being illuminated on a backside thereof with light from said light source;
projecting lens means for projecting in a magnified fashion the image displayed on said liquid crystal panel; and
screen means arranged to receive the magnified image projected from said projecting lens thereon for displaying said magnified image, said screen means being tilted at a predetermined angle in a direction opposite to the tilting direction of said liquid crystal display panel;

an angle $\theta$ formed between said liquid crystal display panel and a line perpendicular to said optical axis of said reflecting mirror bearing the following relationship with an angle $\theta'$ formed between said liquid crystal display panel and a vertical line of said screen means:

$$(Z_o + y \tan \theta)(Z_o' + y' \tan \theta') = f \cdot f' = -f^2$$

where:
- f: focal length of said projecting lens means on the side of said liquid crystal display panel;
- Zo: position on said optical axis of said reflecting mirror with "f" set as the origin;
- y: position on a line perpendicular to said optical axis;
- f': focal length of said projecting lens means on the side of said screen means;
- Zo': position on said optical axis of said reflecting mirror with "f'" set as the origin; and
- y': position on a line perpendicular to said optical axis.

* * * * *